UNITED STATES PATENT OFFICE.

FRANK Y. KEATOR, OF AURORA, ILLINOIS, ASSIGNOR OF ONE-HALF TO HASKELL C. DAVIS, OF EVANSTON, ILLINOIS.

CONFECTION FOR USE AS A CHEWING-GUM.

1,386,627.          Specification of Letters Patent.     Patented Aug. 9, 1921.

No Drawing.     Application filed April 22, 1918. Serial No. 229,917.

*To all whom it may concern:*

Be it known that I, FRANK Y. KEATOR, a citizen of the United States, residing at Aurora, in the county of Kane and State of Illinois, have invented certain new and useful Improvements in a Confection for Use as Chewing-Gum, of which the following is a specification.

The invention relates to a confection and particularly to a confection in the form of a chewing gum impregnated with an activated or acidulated pepsin or other enzym adapted to have a dissolving effect upon any protein or mucus deposits commonly called dental mucin plaques. These plaques are of an albuminous nature, being generally the residue or result following the eating of albuminous foods and such deposits or films are sometimes called "bacterial plaques" as they are generally known to be carriers of bacteria when they form upon the teeth and result in a breeding ground for bacteria that is harmful to the enamel of the teeth with the result that if, as is commonly known by the medical and dental profession, the "bacterial plaques" are not removed disintegration of the tooth structure will inevitably result and other difficulties and disease such as pyorrhea of the gums and teeth results.

It is well known that albuminous films on the teeth will be attacked or digested and hence removed by an enzym such as pepsin or other digestive ferments when the pepsin is acidulated to render it active, and it is equally well known that pepsin alone is incapable of attacking, breaking down or digesting albuminous deposits or placques on the teeth or albumin in any form. For this reason it has been well known that pepsin before being used as a digestant should be activated by mixing with it acid and this has been a common practice in the use of pepsin as a digestant under conditions where the necessary acid element was lacking. For example it has been common for many years to administer pepsin in combination with an activating acid in the stomach for the purpose of digesting albuminous food materials.

It is also well known that certain acids that activate pepsin may be very injurious on account of attacking the calcium phosphate in the enamel structure of the teeth. For this reason it is desirable that pepsin should be combined with an activating acid that will not attack the enamel structure of the teeth.

There are a number of such acids that may be employed under certain conditions, one of which is acid calcium phosphate.

In making my improved chewing gum I use any desired quantity of chicle as the basis for the composition and add to this a small percentage preferably about one per cent. or less of the product of an unorganized ferment in the form of an enzym, preferably in the form known as pepsin. It is well known that pepsin has the quality of digesting albuminous materials when activated and I prefer to add to the chicle and pepsin acid calcium phosphate about one hundredth of one per cent.

Acid calcium phosphate is ordinarily prepared by treating calcium phosphate with hydro-chloric acid and when the same has been used as a mouth wash or dentifrice it has been common in order to protect the teeth from contact with unspent acid to add to the compound comparatively large quantities of some protective agency, which has resulted in the addition of larger quantities of neutral material as tri-calcium phosphate, than would be desirable in a chewing gum.

I have also discovered that the combination of the acid calcium phosphate whether in the acid form when introduced into the mouth or acidulated thereafter, as described, has the effect of modifying the quality of the chicle of my chewing gum rendering the same of a smoother and softer character and hence improving its quality as a vehicle for carrying the activated enzym to the teeth and assisting in the physical operation of cleansing the teeth with the use of a minimum amount of abrasive materials. This is particularly true since in chewing gum abrasive materials would be highly objectionable on account of the fact of the longer relative use of the chewing gum over ordinary dentifrices.

I have found that the acid calcium phosphate is modified by contact with chicle, rendering same somewhat less liable to deleteriously affect the enamel of the teeth but without at the same time interfering with its function in activating the enzym. The tendency in the use of the gum will be for the acid calcium phosphate and the enzym to disappear but not until the primary effect of the use of the gum, that of cleansing the teeth has been secured.

In the preparation of my chewing gum I thoroughly mix the one per cent. of pepsin and the one hundredth part of one per cent. of acid calcium phosphate with approximately ninety-eight and ninety-nine one hundredths per cent. of chicle, a suitable flavoring ingredient and such sugar or other sweetening material as may be desired. Any desired flavoring ingredient such as mint or fruit flavorings commonly used in confections may be employed.

The pepsin and other ingredients after being thoroughly co-mingled or intermixed with the chicle results in a product which may be prepared and distributed for sale in any desired manner.

A chewing gum prepared as herein specified is highly advantageous not only as a confection but also the gum acts as the most admirable form of conveyer for the activated enzym which will thoroughly dissolve from the teeth any albuminous deposits which may be in the form of "dental plaques" and in removing same from the teeth will render such deposits harmless and at the same time thoroughly cleanse the teeth and mouth.

Chewing gum is also a well known digestive in stimulating the secretion from the salivary glands so that my improved chewing gum is both a digestive of food in the stomach inasmuch as it aids digestion by promoting the secretion of the glands referred to, while at the same time it is a digestant because the activated enzym of the gum will dissolve dental mucin films or "dental plaques" from the teeth in a more thorough manner than can possibly be obtained in the application of any such ingredients to the teeth with any form of mechanical device such as brushes and the like from the fact that chicle particularly when modified and softened by the use of acid calcium phosphate as described, is of a character to closely surround the teeth as the gum is being chewed, and thus to present the activated enzym in the form of the acidulated pepsin to every part of the teeth including crevices adjacent to the teeth, with the result that the teeth are cleansed in a more thorough manner than is possible by any other method known to me.

It will be apparent that when the gum is used the cleansing process will continue as long as the gum is chewed or until the material comprising the activated enzym shall be entirely removed from the chicle.

The convenience with which the confection such as chewing gum may be carried will be apparent and more particularly so with respect to travelers, school children and persons in military service, and the like, who may find it inconvenient to carry the usual tooth paste, soaps or powders and brushes which also require water in the washing and cleansing operation.

I claim:

1. A confection for use as a chewing gum, containing chicle, and acid calcium phosphate in combination with an enzym as pepsin.

2. A confection for use as chewing gum, containing chicle approximately ninety-eight and ninety-nine one hundredths per cent., and acid calcium phosphate approximately one one hundredth per cent. and an enzym as pepsin approximately one per cent.

3. A chewing gum comprising a mixture of chicle, pepsin and an acid which will not attack the enamel structure of the teeth and being adapted to activate the pepsin.

In testimony whereof I have signed my name to this specification on this 16th day of April, A. D. 1918.

FRANK Y. KEATOR.